United States Patent
Kim

(10) Patent No.: US 8,253,625 B2
(45) Date of Patent: Aug. 28, 2012

(54) ARRAY ANTENNA SYSTEM IN BASE STATION

(75) Inventor: Duk-Yong Kim, Gyeonggi-do (KR)

(73) Assignee: KMW Inc. (KR)

( * ) Notice: Subject to any disclaimer, the term of this patent is extended or adjusted under 35 U.S.C. 154(b) by 506 days.

(21) Appl. No.: 12/627,185

(22) Filed: Nov. 30, 2009

(65) Prior Publication Data
US 2010/0135192 A1 Jun. 3, 2010

Related U.S. Application Data

(60) Provisional application No. 61/118,932, filed on Dec. 1, 2008.

(30) Foreign Application Priority Data

Nov. 28, 2008 (KR) .................. 10-2008-0120158

(51) Int. Cl.
*H01Q 3/00* (2006.01)
(52) U.S. Cl. ..................... 342/373; 342/368
(58) Field of Classification Search .............. 342/368, 342/373–374; 455/562.1
See application file for complete search history.

(56) References Cited

U.S. PATENT DOCUMENTS

2002/0080068 A1* 6/2002 Kim et al. ............. 342/374
2003/0189515 A1* 10/2003 Jacomb-Hood et al. ...... 342/373

* cited by examiner

*Primary Examiner* — Jack W Keith
*Assistant Examiner* — Fred H Mull

(57) ABSTRACT

An array antenna system in a BS has a horizontal-beam-radiation-pattern-forming module for receiving/outputting a plurality of transmission/reception signals from/to a BTS via the input/output ports at the one end of the horizontal-beam-radiation-pattern-former, and receiving/outputting a plurality of transmission/reception signals from/to a plurality of antennas via the input/output ports at the other end of the horizontal-beam-radiation-pattern-former, and a plurality of vertical-beam-radiation-pattern-forming modules installed on the plurality of antennas, respectively, to form a vertical beam radiation pattern for the transmission/reception signals, each for receiving a transmission signal from the horizontal-beam-radiation-pattern-forming module, dividing the transmission signal, providing the divided signal to antenna elements, filtering and amplifying signals received from the antenna elements according to a predetermined reception band, combining the amplified signals, and providing the combined signal to the horizontal-beam-radiation-pattern-forming module.

20 Claims, 17 Drawing Sheets

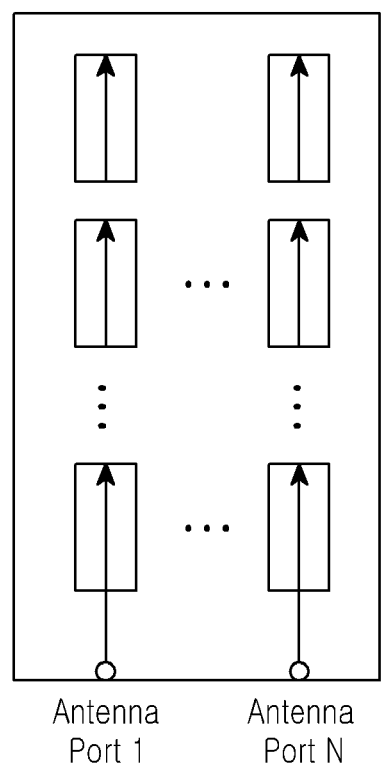
Antenna Port 1    Antenna Port N
FIG.7A
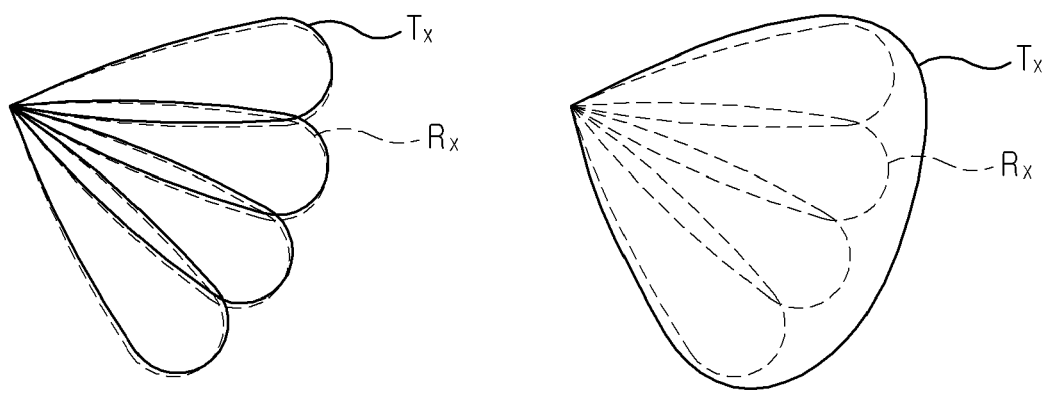
FIG.7B                    FIG.7C

ARRAY ANTENNA SYSTEM IN BASE STATION

CLAIMS OF PRIORITY

This application claims priority from an application entitled "Array Antenna System in Base Station" filed in the Korean Intellectual Property Office on Nov. 28, 2008 and assigned Serial No. 10-2008-0120158, and the contents of which are hereby incorporated by reference in its entirety, and this application claims priority from U.S. provisional application 61/118,932, filed on Dec. 1, 2008, the contents of which are hereby incorporated by reference in its entirety.

BACKGROUND OF THE INVENTION

1. Field of the Invention

The present invention generally relates to an antenna system in a BS (base station). More particularly, the present invention relates to an array antenna system for forming horizontal and/or vertical beam radiation patterns individually.

2. Description of the Related Art

Unlike a wired channel environment, a wireless channel environment in which a mobile communication system exists distorts a real transmission signal due to many factors including multipath interference, shadowing, propagation attenuation, time-variant noise, and interference. Fading caused by the multipath interference is closely related to signal reflections resulting from the mobility of a user, i.e. a user terminal. With the fading, a received signal includes a real transmission signal and an interference signal in combination. The fading phenomenon is a significant factor that impairs high-speed data communication in the wireless channel environment, because it may distort the amplitude and phase of the received signal. Many studies have been conducted to solve the fading phenomenon. In this context, it can be concluded that signal loss caused by the nature of mobile communication channels such as fading and user interference should be minimized to transmit data at high rates in the mobile communication system.

To physically improve uplink gain, BS antenna systems adopt reception diversity. From the software perspective, they use a technique for obtaining a processing gain using a rake receiver.

The recent need for further securing an uplink/downlink gain due to the increase of the complexity of transmission schemes has driven independent development of Multiple Input Multiple Output (MIMO)-based and smart antenna (adaptive array antenna)-based techniques. Now the developmental trend is to use the two techniques in conjunction by combining the physical and software schemes.

SUMMARY OF THE INVENTION

An object of the present invention is to provide an array antenna system for a BS, in which an array antenna for an uplink/downlink is formed in a hardware structure that can handle MIMO schemes, including 2T2R, 2T4R, and 4T4R, to thereby maximize a link gain in terms of hardware and minimize loss in lines within the antenna.

To achieve the above object, there is provided an array antenna system in a BS, including a horizontal-beam-radiation-pattern-forming-module that has a horizontal-beam-radiation-pattern-former, and a plurality of vertical-beam radiation-pattern-forming-modules. To form a horizontal-beam radiation pattern for a plurality of (n) transmission/reception signals, the horizontal-beam-radiation pattern-former divides each of signals received from a plurality of (n) input/output ports at one end into n signals, complementarily shifts the phases of the divided signals, combines each of the plurality of (n×n) phase-shifted signals with signals from the other input/output ports at the one end, outputs the combined signals to a plurality of (n) input/output ports at the other end, and outputs signals received from the plurality of input/output ports at the other end to the plurality of input/output ports at the one end by performing the above operation in a reverse order. The horizontal-beam-radiation-pattern-forming module receives/outputs a plurality of transmission/reception signals from/to a base transceiver station (BTS) via the input/output ports at the one end of the horizontal-beam-radiation-pattern-former, and receives/outputs a plurality of transmission/reception signals from/to a plurality of antennas via the input/output ports at the other end of the horizontal-beam-radiation-pattern-former. The vertical-beam-radiation-pattern-forming modules are installed on an antenna basis. In order to form a vertical-beam radiation pattern of a plurality of (m) transmission/reception signals, each vertical-beam-radiation-pattern-forming module divides a transmission signal received from the horizontal-beam-radiation-pattern-forming module into a plurality of (m) signals, provides each of the divided signals to at least one antenna element, filters a signal received from the at least one antenna element according to a predetermined reception band, amplifies the filed signal, and provides the amplified signal to the horizontal-beam-radiation-pattern-forming module.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 7A, 7B and 7C illustrate an exemplary structure and beam radiation pattern of an array antenna with radiation elements having a vertical pattern;

Throughout the drawings, the same drawing reference numerals will be understood to refer to the same elements, features and structures.

Detailed Description Of Exemplary Embodiments

Best Mode for Carrying Out the Invention

The matters defined in the description, such as a detailed construction and elements, are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An array antenna system according to the present invention will be described in the context of forming an array of n×m (width and length) antenna elements, for convenience sake. Subarrays, each having a group of antenna elements on a column basis, will be referred to as antennas. These subarrays (antennas) can be provided on physically separate reflection plates (laterally connected to one another).

As described in detail below, the present invention largely includes a horizontal-beam-radiation-pattern-forming module for forming a horizontal beam radiation pattern and a vertical-beam-radiation-pattern-forming module for forming a vertical beam radiation pattern. The horizontal- and vertical-beam-radiation-pattern-forming modules are integrally installed within a radome of a BS antenna device, to thereby minimize signal loss generated on an internal line of the antenna device.

Figure 1:
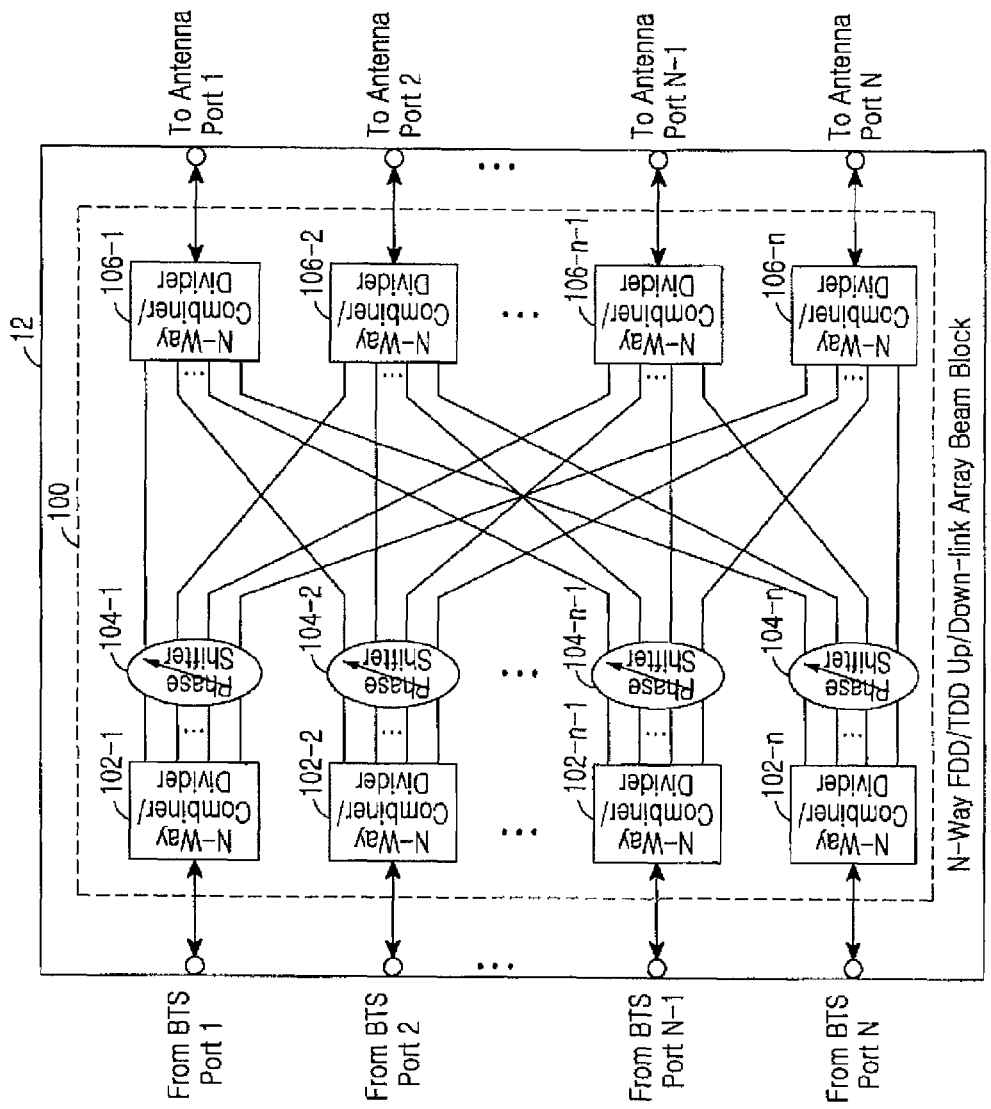
FIG. 1 is a block diagram of a horizontal-beam-radiation-pattern-forming module according to an embodiment of the present invention.

FIG. 1 is a block diagram of a horizontal-beam-radiation-pattern-forming module according to an embodiment of the present invention. Referring to FIG. 1, a horizontal-beam-radiation-pattern-forming module 12 according to the present invention includes a horizontal-beam-radiation-pattern-former 100 to form a horizontal-beam radiation pattern for a plurality of (n) transmission/reception signals, dividing each of signals received from a plurality of (n) input/output ports (e.g. upper input/output ports) at one end into n signals, complementarily shifting the phases of the divided signals, combining each of the plurality of (n×n) phase-shifted signals with signals from the other input/output ports at the one end, outputting the combined signals to a plurality of (n) input/output ports at the other end (e.g. lower input/output ports), and outputting signals received from the plurality of input/output ports at the other end to the plurality of input/output ports at the one end by performing the above operation in a reverse order.

The horizontal-beam-radiation-pattern-forming module 100 receives/outputs a plurality of transmission/reception signals from/to a Base Transceiver Station (BTS, not shown) via the input/output ports at the one end and receives/outputs a plurality of transmission/reception signals from/to a plurality of antennas via the input/output ports at the other end.

Thus, the plurality of transmission signals received from the BTS can form a horizontal-beam radiation pattern having an appropriate lobe for each transmission signal, when they are radiated from the plurality of antennas through the horizontal-beam-radiation-pattern-former 100.

To be more specific about the configuration of the horizontal-beam-radiation-pattern-former 100, a plurality of (n) first combiners/dividers 102-1 to 102-n are provided for transmission signals on a one-to-one correspondence, for dividing a transmission signal received via each of combination ports at the one end to a plurality of division ports at the other end, combining signals received through the division ports, and outputting the combined signals to the combination ports. The combination ports of the first combiners/dividers 102-1 to 102-n correspond to the input/output ports at the one end in the horizontal-beam-radiation-pattern-former 100.

For the respective first combiners/dividers 102-1 to 102-n, a plurality of phase shifters 104-1 to 104-n are provided to complementarily shift the phases of the divided signals received from the first combiners/dividers 102-1 to 102-n. The signals output from the phase shifters 104-1 to 104-n are grouped such that each group has different transmission signals, and output to a plurality of second combiners/dividers 106-1 to 106-n. The second combiners/dividers 106-1 to 106-n have division ports and combination ports in the same configurations as those of the first combiners/dividers 102-1 to 102-n. The combination ports of the second combiners/dividers 106-1 to 106-n correspond to the input/output ports at the other end, connected to the antennas of the horizontal-beam-radiation-pattern-former 100.

The phase shifters 104-1 to 104-n can be electrical, mechanical, or variable phase shifters that can change the phase shift degrees of a plurality of received signals. The first combiners/dividers 102-1 to 102-n and the second combiners/dividers 106-1 to 106-n can be variable combiners/dividers that can vary their combination/division ratio appropriately according to a control signal received from the BTS.

Figure 2:
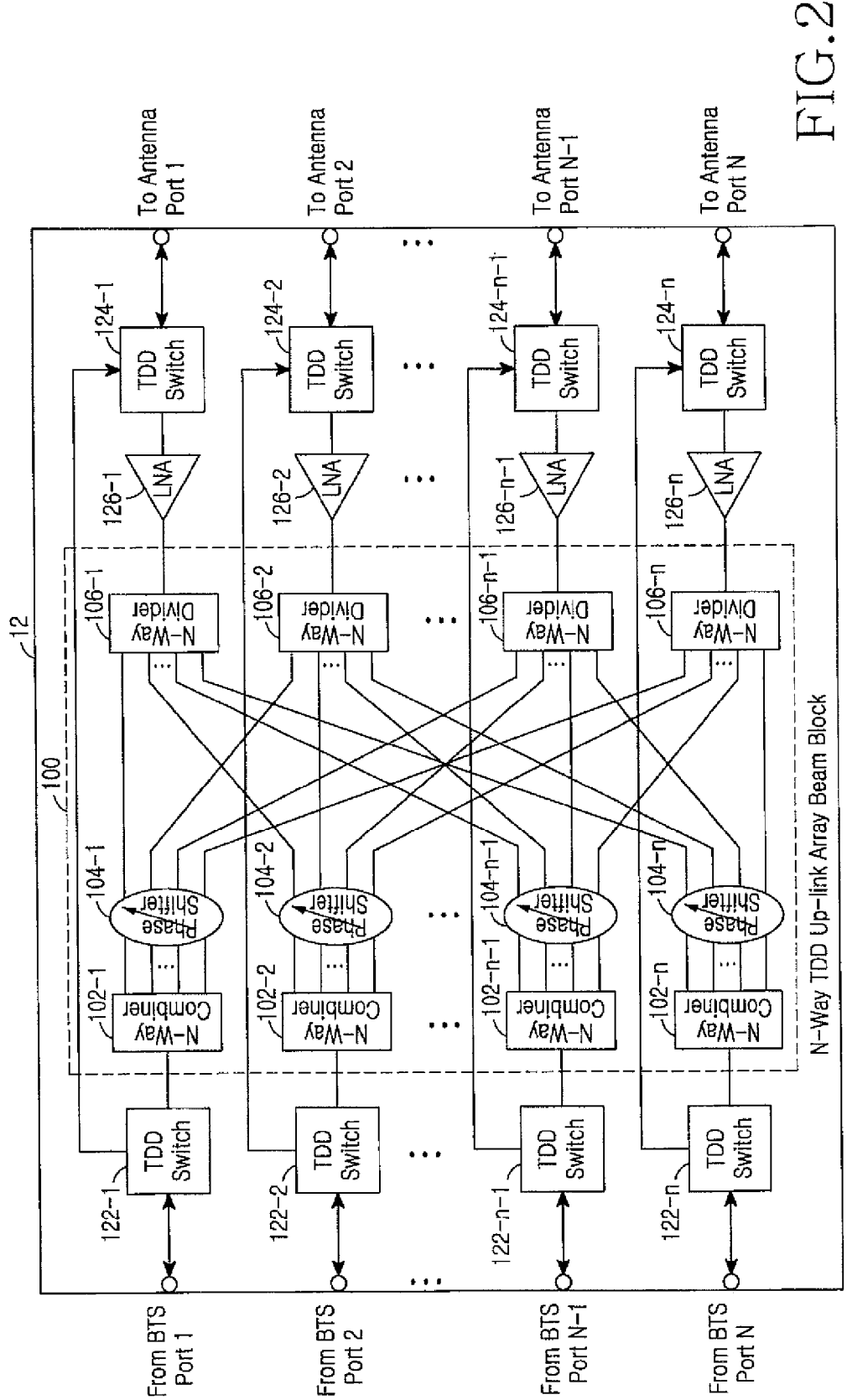
FIG. 2 is a block diagram of a horizontal-beam-radiation-pattern-forming module applied to a time-division-duplexing (TDD) system according to another embodiment of the present invention.

FIG. 2 is a block diagram of a horizontal-beam-radiation-pattern-forming module applied to a TDD system according to another embodiment of the present invention. Referring to FIG. 2, a horizontal-beam-radiation-pattern-forming module 12 according to the second embodiment of the present invention can have the same configuration as the horizontal-beam-radiation-pattern-forming module 100 illustrated in FIG. 1 according to the first embodiment of the present invention. In addition, the horizontal-beam-radiation-pattern-forming module 12 includes a path former for making transmission signals received from the BTS bypass the horizontal-beam-radiation-pattern-former 100 for direct output to antennas in TDD and making signals received from the antennas pass through the horizontal-beam-radiation-pattern-former 100 in TDD.

More specifically, the path former is provided with a plurality of first TDD switches 122-1 to 122-n installed in a plurality of input/output paths between the BTS and the horizontal-beam-radiation-pattern-former 100, for separating transmission signals from reception signals according to a TDD switching signal received from an external control module (not shown), outputting signals received from the horizontal-beam-radiation-pattern-former 100 to the BTS, and making transmission signals bypass the horizontal-beam-radiation-pattern-former 100. The path former further includes a plurality of second TDD switches 124-1 to **124-*n* installed in a plurality of input/output paths between the antennas and the horizontal-beam-radiation-pattern-former 100, for separating transmission signals from reception signals according to a TDD switching signal received from the external control module (not shown), outputting signals received from the antennas to the horizontal-beam-radiation-pattern-former 100, and providing transmission signals received from the first TDD switches 122-1 to 122-*n*** to the antennas.

A plurality of low-noise-amplifiers (LNAs) 126-1 to **126-*n* can be provided in reception signal paths between the second TDD switches 124-1 to 124-*n* and the horizontal-beam-radiation-pattern-former 100**, for low-noise-amplification of received signals.

Meanwhile, since the first and second combiners/dividers 102 and 106 of the horizontal-beam-radiation-pattern-former 100 do not need to process transmission signals, they can be named combiners and dividers, respectively. Yet, it is to be understood that they are not changed in their mechanical structures.

Figure 3:
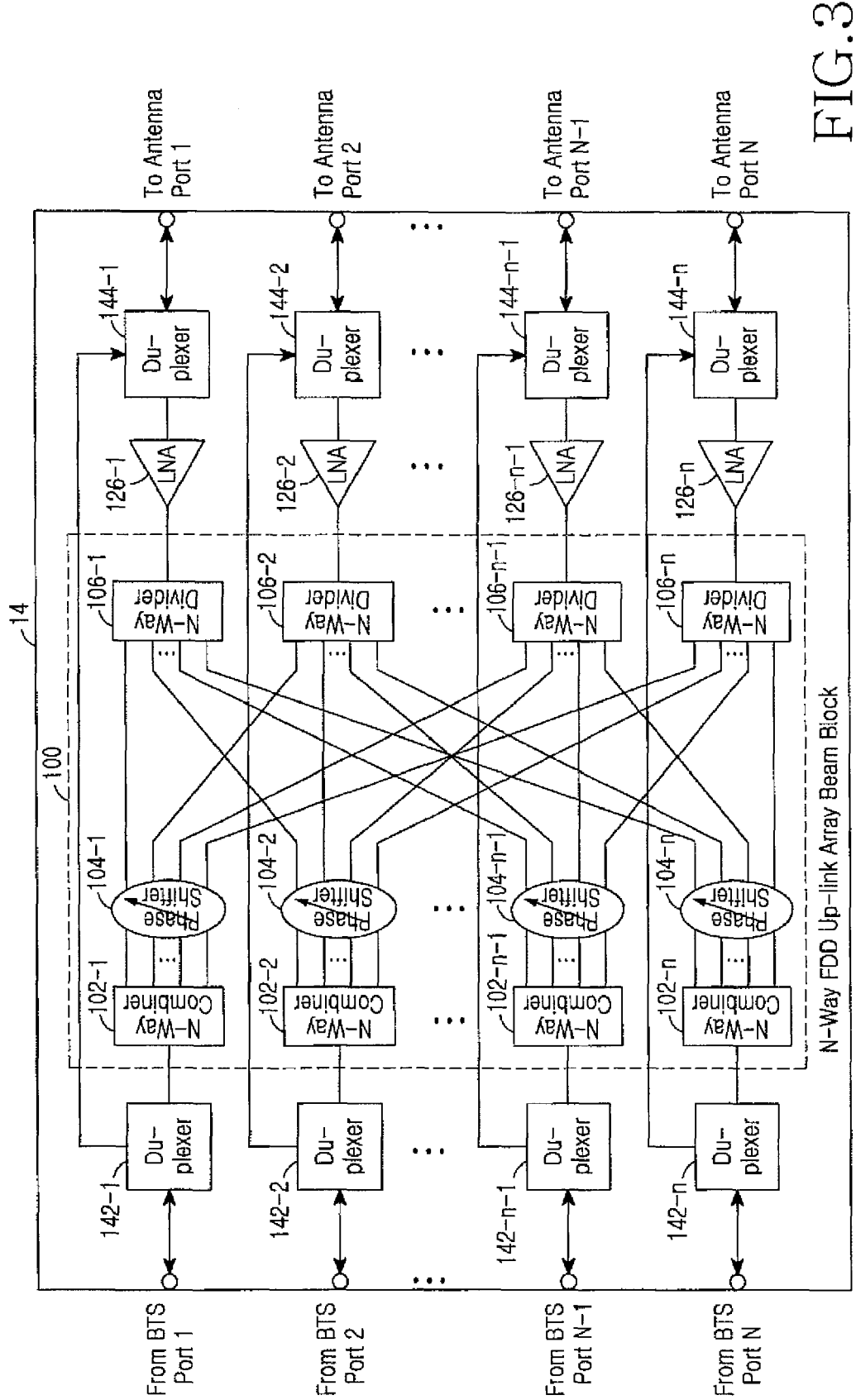
FIG. 3 is a block diagram of a horizontal-beam-radiation-pattern-forming module applied to a frequency-division-duplexing (FDD) system according to a third embodiment of the present invention.

FIG. 3 is a block diagram of a horizontal-beam-radiation-pattern-forming module applied to an FDD system according to a third embodiment of the present invention. Referring to FIG. 3, a horizontal-beam-radiation-pattern-forming module 14 according to the third embodiment of the present invention is almost identical to that illustrated in FIG. 2 according to the second embodiment of the present invention, except that a path former makes transmission signals received from the BTS bypass the horizontal-beam-radiation-pattern-former 100 in FDD, for input to the antennas.

More specifically, the path former according to the third embodiment of the present invention has a plurality of first duplexers 142-1 to **142-*n* and a plurality of second duplexers 144-1 to 144-*n* instead of the plurality of first TDD switches 122-1 to 122-*n* and the plurality of second TDD switches 124-1 to 124-*n*. The first duplexers 142-1 to 142-*n* filter transmission/reception signals, provide the filtered reception signals to the BTS, and provide the filtered transmission signals to the second duplexers 144-1 to 144-*n*, making them bypass the horizontal-beam-radiation-pattern-former 100. The second duplexers 144-1 to 144-*n* filter the transmission/reception signals. They provide reception signals to the horizontal-beam-radiation-pattern-former 100 and transmission signals received from the first duplexers 142-1 to 142-*n*** to the antennas.

The structures of the horizontal-beam-radiation-pattern-forming modules illustrated in FIGS. 2 and 3 according to the second and third embodiments of the present invention are characterized in that a plurality of arrayed beams are formed for the uplink without implementing diversity for transmission signals. The bypassing of transmission signals reduces loss in transmission lines and gives freedom to design an appropriate beam pattern for the transmission signals.

Meanwhile, vertical-beam-radiation-pattern-forming modules are installed for antennas, each for one antenna, in order to form a vertical beam radiation pattern of a plurality of (m) transmission/reception signals. Each vertical-beam-radiation-pattern-forming module divides a transmission signal received from the horizontal-beam-radiation-pattern-forming module into a plurality of (m) signals and provides each of the divided signals to at least one antenna element. It also filters a signal received from the at least one antenna element according to a predetermined reception band, amplifies the filed signal, and provides the amplified signal to the horizontal-beam-radiation-pattern-forming module. The configuration and operation of the vertical-beam-radiation-pattern-forming modules will be described below in detail with attached drawings.

Figure 4:
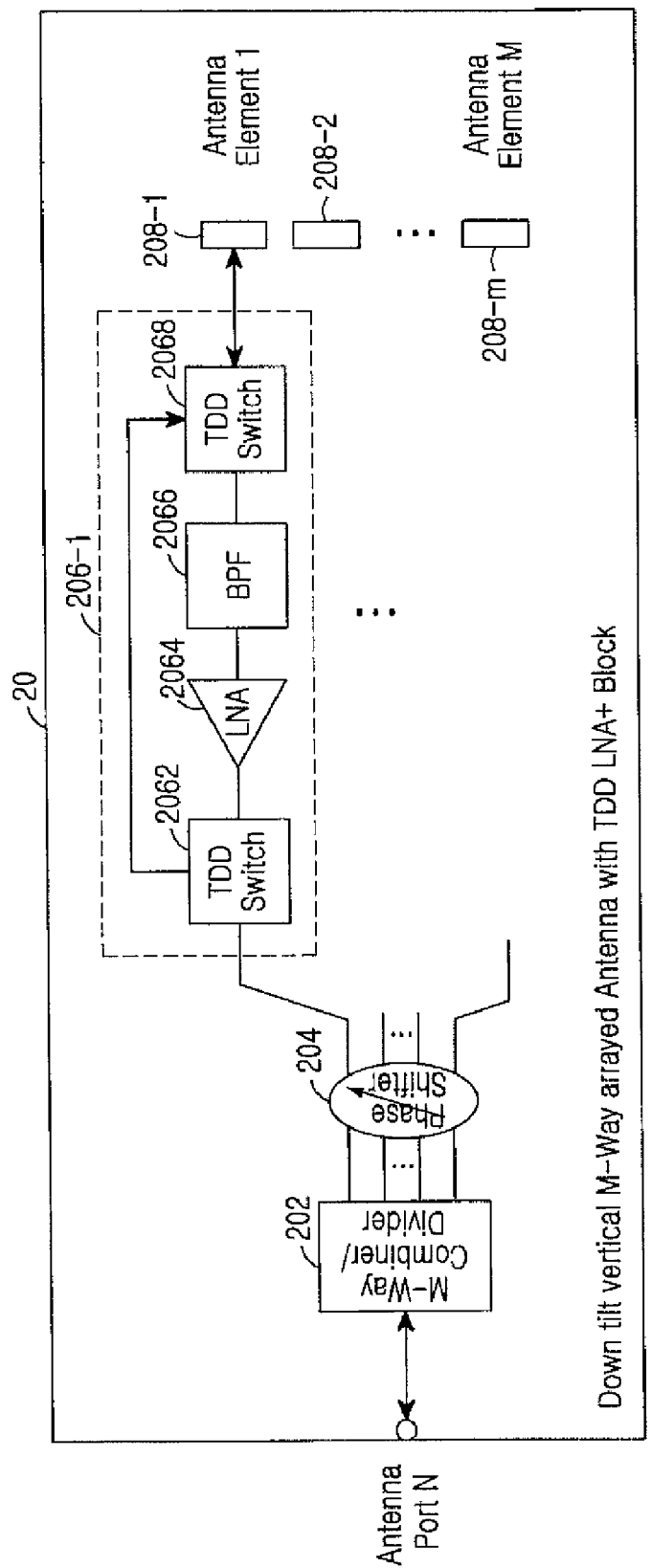
FIG. 4 is a block diagram of a vertical-beam-radiation-pattern-forming module applied to the TDD system according to an embodiment of the present invention.

FIG. 4 is a block diagram of a vertical-beam-radiation-pattern-forming module applied to the TDD system according to an embodiment of the present invention. Referring to FIG. 4, a plurality of vertical-beam-radiation-pattern-forming modules 20 are installed, each for one antenna according to the embodiment of the present invention. To form a vertical beam radiation pattern for an antenna, each vertical-beam-radiation-pattern-forming module 20 divides a transmission signal received from the horizontal-beam-radiation-pattern-forming module into a plurality of (m) signals, shifts the phases of the divided signals complementarily, and provides the phase-shifted signals to a plurality of (m) antenna elements 208-1 to **208-*m*. The vertical-beam-radiation-pattern-forming module 20 also filters signals received from the respective antenna elements 208-1 to 208-*m*** according to a predetermined reception band, amplifies the filtered signals, and provides the amplified signals to the horizontal-beam-radiation-pattern-forming module. Herein, transmission is separated from reception in TDD.

To be more specific, the vertical-beam-radiation-pattern-forming module 20 includes a combiner/divider 202 for dividing a transmission signal received from the horizontal-beam-radiation-pattern-forming module via one combination port into a plurality of (m) signals, providing the divided signals to a plurality of (m) division ports at the other end, combining signals received through the division ports, and providing the combined signal to the combination port, a phase shifter 204 for shifting the phases of the divided signals received from the combiner/divider 202 complementarily and providing signals received from antenna elements to the combiner/divider 202 by performing the transmission operation reversely, and a plurality of received signal amplifiers 206-1 to **206-*m* (only 206-1 is shown for clarity) for providing a plurality of transmission signals received from the phase shifter 204 to a plurality of (m) antenna elements 208-1 to 208-*m*, filtering signals received through the antenna elements 208-1 to 208-*m* according to a predetermined reception band, amplifying the filtered signals, and providing the amplified signals to the phase shifter 204**.

Each of the received signal amplifiers 206-1 to **206-*m* includes a first TDD switch 2062 for switching to a transmission/reception path according to a TDD switching signal, a second TDD switch connected to a predetermined antenna element, for switching to the transmission/reception path according to the TDD switching signal, a BPF 2066 for receiving a signal from the second TDD switch 2068 and passing only frequencies of the predetermined reception band during reception, and an LNA 2064 for low-noise-amplifying the signal received from the BPF 2066 and providing the low-noise-amplified signal to the first TDD switch 2062**.

As described above, because the nearby LNA 2064 amplifies a signal received through the antenna element, signal loss is minimized in the vertical-beam-radiation-pattern-forming module of the present invention. Particularly, the received signal is amplified before an additional loss occurs in an internal transmission line of the antenna. Therefore, the amplification efficiency of a valid signal is further increased.

Figure 5:
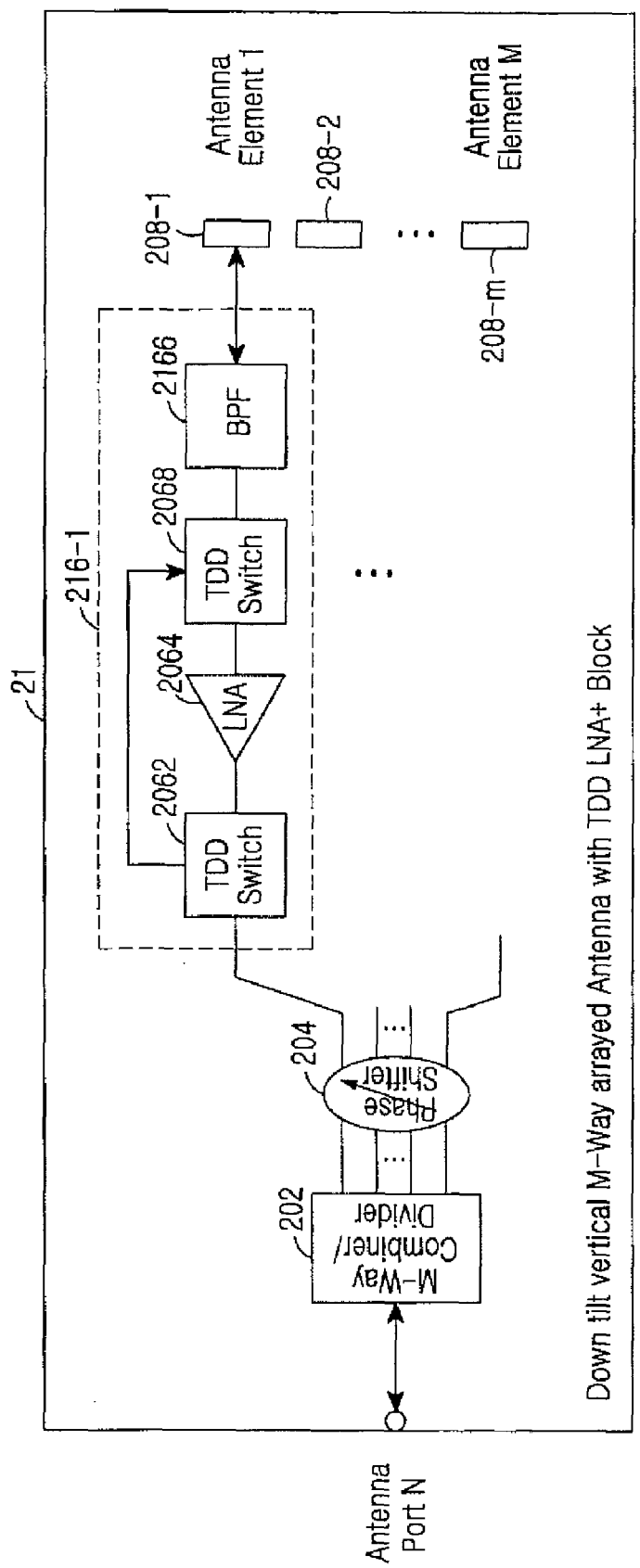
FIG. 5 is a block diagram of a vertical-beam-radiation-pattern-forming module applied to the TDD system according to another embodiment of the present invention.

FIG. 5 is a block diagram of a vertical-beam-radiation-pattern-forming module applied to the TDD system according to another embodiment of the present invention. Referring to FIG. 5, a vertical-beam-radiation-pattern-forming module 21 according to the second embodiment of the present invention is almost identical in configuration to that illustrated in FIG. 4 according to the first embodiment of the present invention, except the configuration of received signal amplifiers 216-1 to 216-*m* (only 216-1 is shown). The received signal amplifiers 216-1 to 216-*m* are similar to the received signal amplifiers illustrated in FIG. 4 in terms of configuration and they differ in that the former has a BPF 2166 for a transmission/reception band between the second TDD switch 2068 and an antenna element, instead of the BPF 2066 for filtering a received signal. Since a transmission signal passes through the BPF 2166, the received signal amplifier 2167 illustrated in FIG. 5 improves spurious emission.

Figure 6:
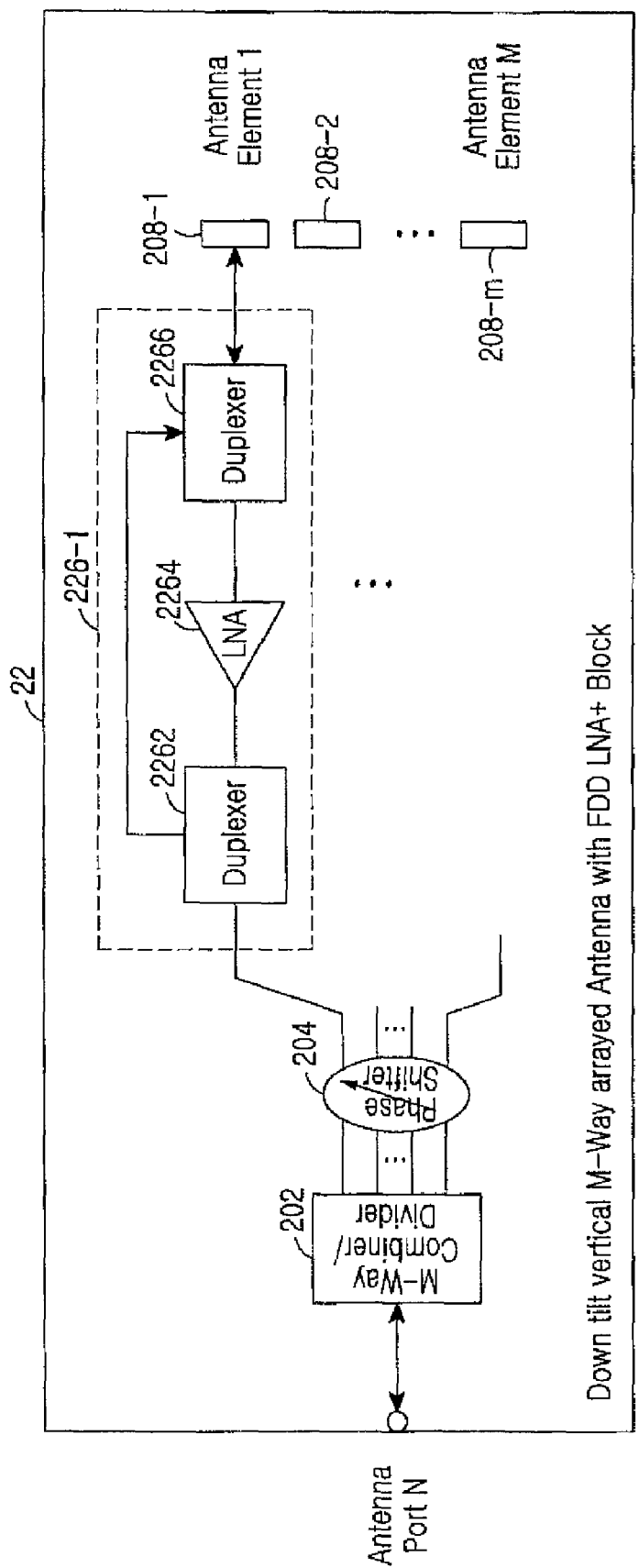
FIG. 6 is a block diagram of a vertical-beam-radiation-pattern-forming module applied to the FDD system according to a third embodiment of the present invention.

FIG. 6 is a block diagram of a vertical-beam-radiation-pattern-forming module applied to the FDD system according to a third embodiment of the present invention. Referring to FIG. 6, a vertical-beam-radiation-pattern-forming module 22 according to a fourth embodiment of the present invention is similar in configuration to the first and second embodiments of the present invention illustrated in FIGS. 4 and 5, except that received signal amplifiers 226-1 to 226-*m* (again, only 226-1 is shown) have an FDD configuration.

That is, each of the received signal amplifiers 226-1 in the vertical-beam-radiation-pattern-forming module includes first and second duplexers 2262 and 2266 for separating a transmission path from a reception path and an LNA 2264 in a reception path between the first and second duplexers 2262 and 2266, for amplifying a received signal.

FIGS. 7A, 7B and 7C illustrate an exemplary structure and horizontal-beam radiation pattern of an array antenna with radiation elements having a vertical pattern being a single-polarization pattern. As illustrated in FIGS. 7B and 7C, the array antenna system of the present invention includes radiation elements of a vertical pattern. For instance, for four antennas and four transmission/reception signals, the horizontal-beam radiation pattern can be as illustrated in FIGS. 7B and 7C. FIG. 7B denotes a beam radiation pattern in the case of non-bypassing of a transmission signal as illustrated in FIG. 1 and FIG. 7C denotes a beam radiation pattern in the case of bypassing of a transmission signal as illustrated in FIGS. 2 and 3.

That is, the configuration illustrated in FIG. 1 can generate a beam radiation pattern in which the four transmission (Tx)/reception (Rx) signals have their respective steering directions. The beam radiation patterns of transmission and reception signals can be identical. In the configurations illustrated in FIGS. 2 and 3, transmission signals are directly provided to antenna elements and thus a beam radiation pattern having one wide steering direction can be formed, without distinctions among the transmission signals.

Figure 8A:
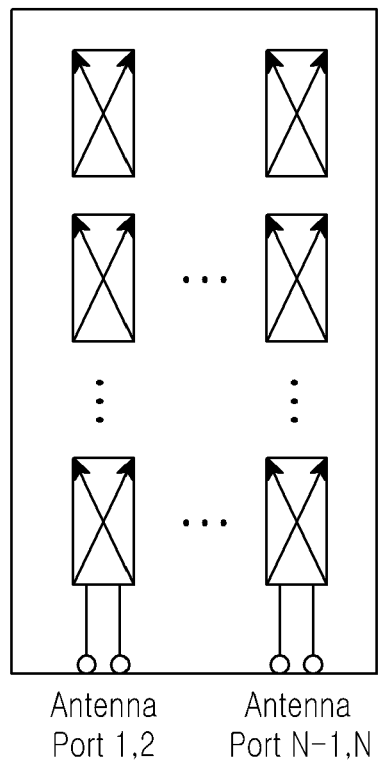
FIGS. 8A, 8B and 8C illustrate an exemplary structure and beam radiation pattern of an array antenna with radiation elements having a polarization pattern.
Figures 8B, 8C:
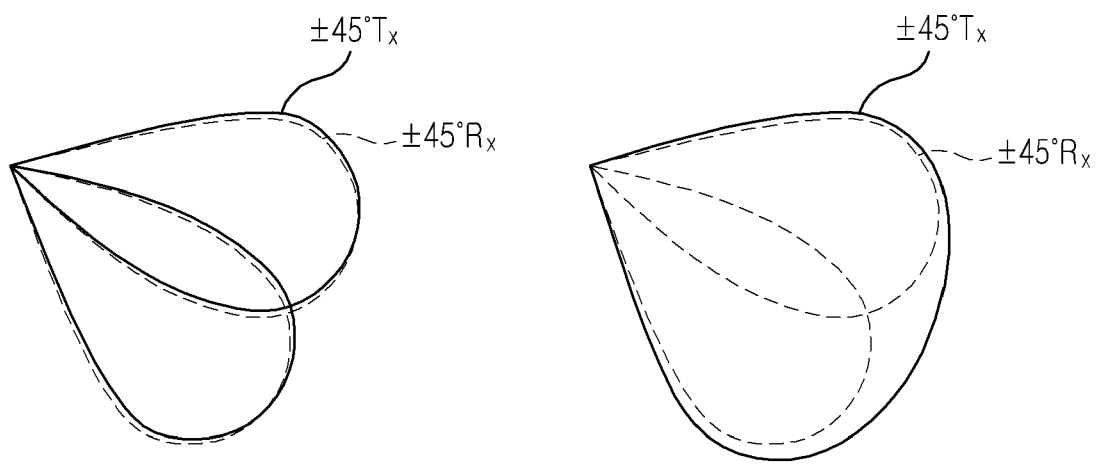

FIGS. 8A, 8B and 8C illustrate an exemplary structure and beam radiation pattern of an array antenna with radiation elements having a ±45-degree polarization pattern being a dual-polarization pattern. As illustrated in FIG. 8A, when the array antenna system of the present invention includes radiation elements having a polarization pattern, two antennas generate +45-degree polarization and −45-degree polarization respectively, thus creating one ±45-degree orthogonal polarization. For instance, for four antennas and four transmission/reception signals, the horizontal beam radiation pattern can be as illustrated in FIGS. 8B and 8C. FIG. 8B denotes a beam radiation pattern in the case of non-bypassing of a transmission signal as illustrated in FIG. 1 and FIG. 8C denotes a beam radiation pattern in the case of bypassing of a transmission signal as illustrated in FIGS. 2 and 3.

That is, the configuration illustrated in FIG. 1 can generate a beam radiation pattern in which transmission (Tx) and reception (Rx) signals have two ±45-degree polarizations steered in different directions. The beam radiation patterns of transmission and reception signals can be identical. In the configurations illustrated in FIGS. 2 and 3, transmission signals are directly provided to antenna elements and thus a beam radiation pattern having one wide steering direction can be formed.

Figure 9:
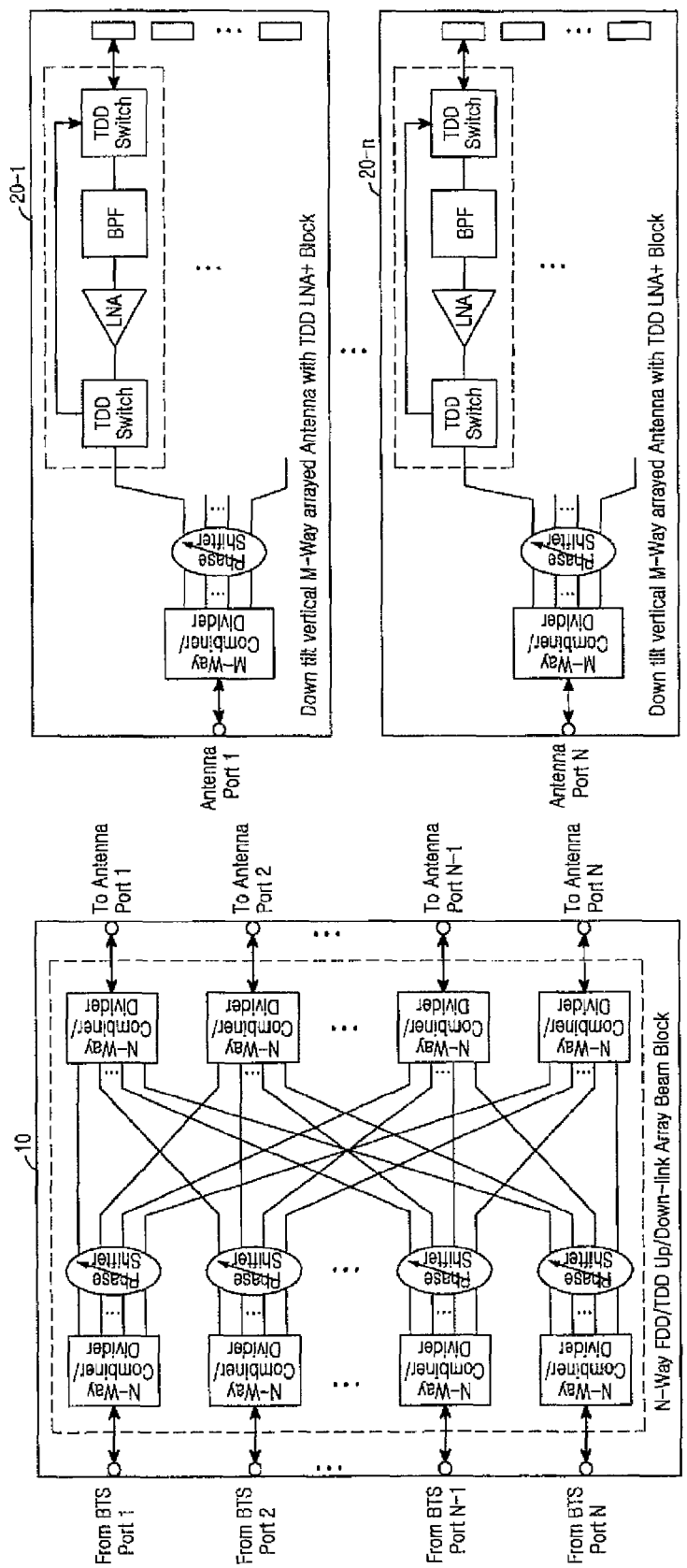
FIG. 9 is a block diagram of a whole BS array antenna system applied to the TDD system according to an embodiment of the present invention.

FIG. 9 is a block diagram of a whole BS array antenna system applied to the TDD system according to an embodiment of the present invention. Referring to FIG. 9, the array antenna system according to the embodiment of the present invention includes the horizontal-beam-radiation-pattern-forming module 10 illustrated in FIG. 1 according to the first embodiment of the present invention and a plurality of vertical-beam-radiation-pattern-forming modules 20 illustrated in FIG. 4 according to the first embodiment of the present invention. This structure enables formation of n horizontally arrayed beams and electric vertical tilting for the downlink/uplink in TDD and reduces the noise of received signals by the received signal amplifiers.

Figure 10:
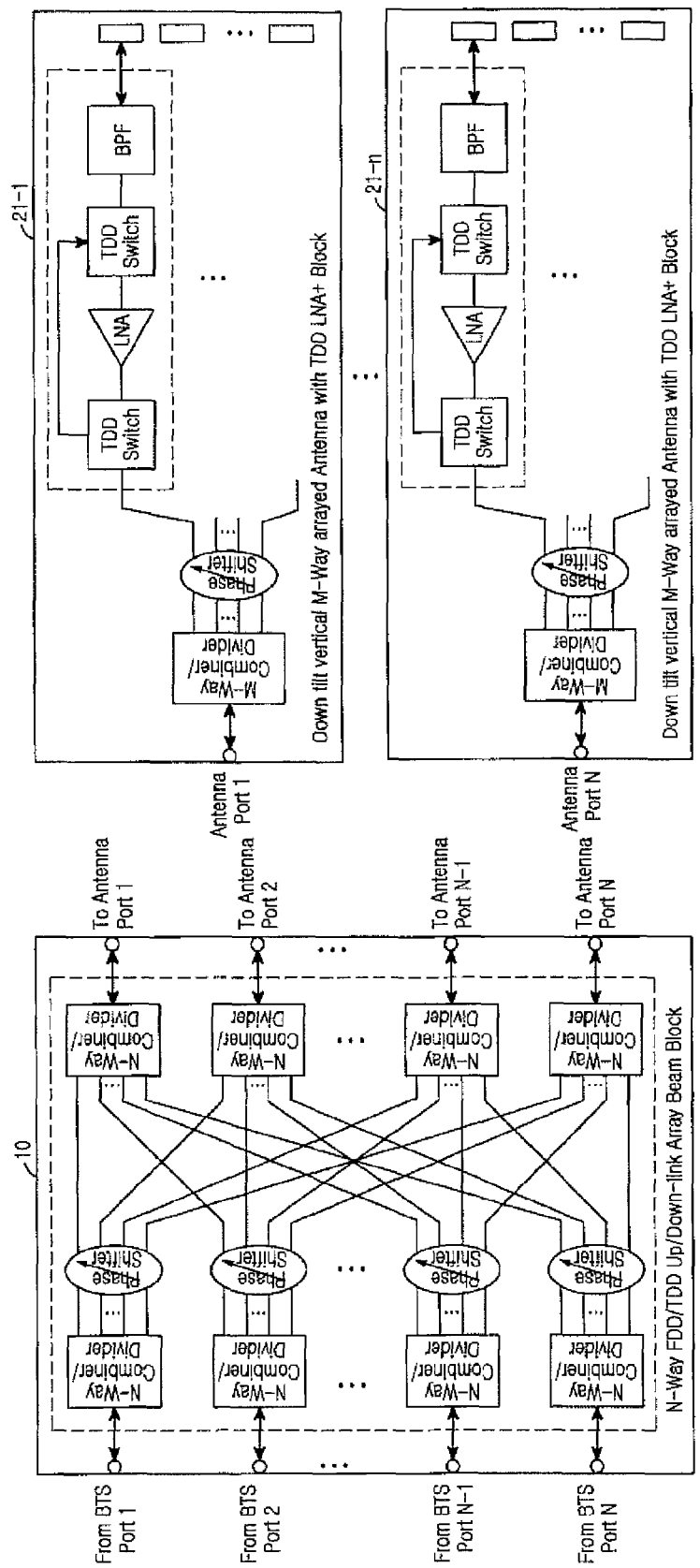
FIG. 10 is a block diagram of a whole BS array antenna system applied to the TDD system according to another embodiment of the present invention.

FIG. 10 is a block diagram of a whole BS array antenna system applied to the TDD system according to another embodiment of the present invention. Referring to FIG. 10, the array antenna system according to the second embodiment of the present invention includes the horizontal-beam-radiation-pattern-forming module 10 illustrated in FIG. 1 according to the first embodiment of the present invention and a plurality of vertical-beam-radiation-pattern-forming modules 21 illustrated in FIG. 5 according to the second embodiment of the present invention.

Figure 11:
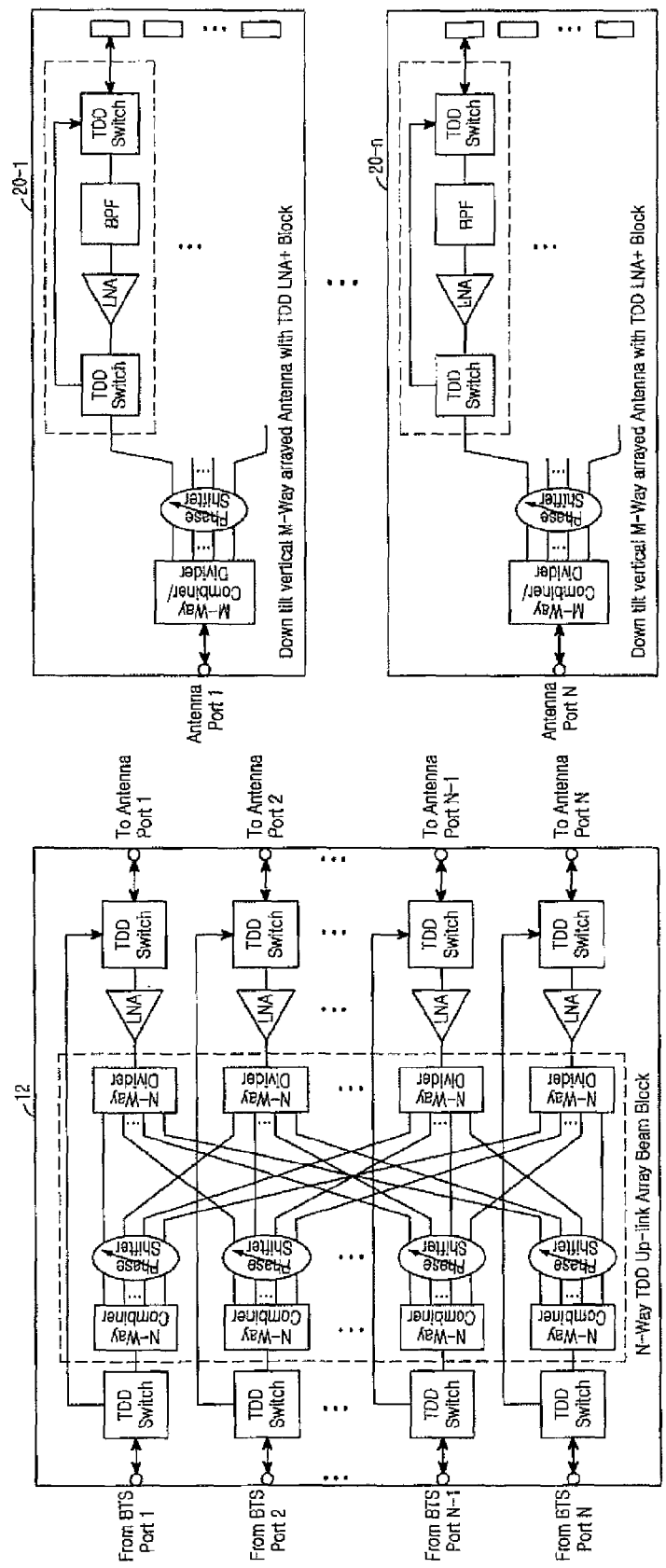
FIG. 11 is a block diagram of a whole BS array antenna system applied to the TDD system according to a third embodiment of the present invention.

FIG. 11 is a block diagram of a whole BS array antenna system applied to the TDD system according to a third embodiment of the present invention. Referring to FIG. 11, the array antenna system according to the third embodiment of the present invention includes one horizontal-beam-radiation-pattern-forming module 12 illustrated in FIG. 2 according to the second embodiment of the present invention and a plurality of vertical-beam-radiation-pattern-forming modules 20 illustrated in FIG. 4 according to the first embodiment of the present invention. This structure enables formation of n horizontally arrayed beams and electric vertical tilting only for the uplink in TDD and reduces the noise of received signals by the received signal amplifiers.

Figure 12:
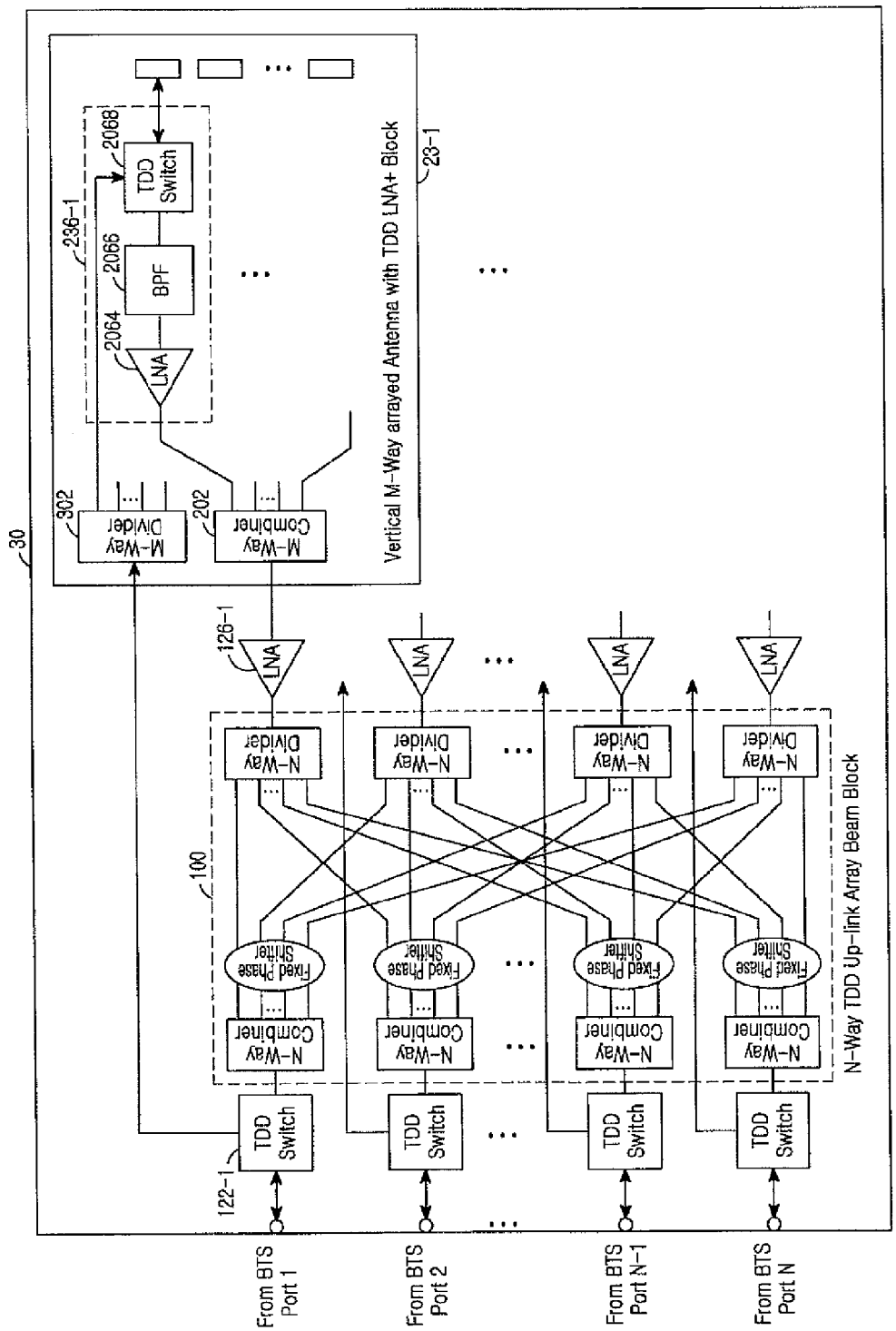
FIG. 12 is a block diagram of a whole BS array antenna system applied to the TDD system according to a fourth embodiment of the present invention.

FIG. 12 is a block diagram of a whole BS array antenna system applied to the TDD system according to a fourth embodiment of the present invention. Referring to FIG. 12, the array antenna system according to the fourth embodiment of the present invention can be considered a modification of the third embodiment of the present invention illustrated in FIG. 11, in which redundant components are eliminated from the structure of the third embodiment.

That is, horizontal/vertical-beam-radiation-pattern-forming modules 30 illustrated in FIG. 12 are basically without second TDD switches 124-1 of the horizontal-beam-radiation-pattern-forming module 12 and the first TDD switches 2062 of the vertical-beam-radiation-pattern-forming modules 20 illustrated in FIG. 11. In the array antenna system, transmission signals switched by first TDD switches 122-1 of the horizontal-beam-radiation-pattern-forming module 12 illustrated in FIG. 11 are directly provided to modified vertical-beam-radiation-pattern-forming modules 23-1 to 23-*m* (only 23-1 is shown), divided, and then output directly to the second TDD switches 2068 in the modified vertical-beam-radiation-pattern-forming modules 23-1 to 23-*m*.

For this purpose, as illustrated in FIG. 12, the modified vertical-beam-radiation-pattern-forming modules 23-1 to 23-m include dividers 302 for dividing transmission signals. The divided signals are provided to the second TDD switches 2068 in the modified vertical-beam-radiation-pattern-forming modules 2236-1 to 2236-m (of which only 2236-1 is shown). Reception signals output from the modified vertical-beam-radiation-pattern-forming modules 23-1 to 23-m are provided to the horizontal-beam-radiation-pattern-former 100 via the LNAs 126-1 to 126-m.

The horizontal-beam-radiation-pattern-former 100 may have fixed phase shifters, not variable phase shifters. In this case, the horizontal beam radiation pattern is fixed. In addition, the modified vertical-beam-radiation-pattern-forming modules 23-1 to 23-m also may have fixed phase shifters so that the vertical beam radiation pattern can be fixed. Or the modified vertical-beam-radiation-pattern-forming modules 23-1 to 23-m may not have phase shifters, thus excluding electric vertical tilting from consideration.

Figure 13:
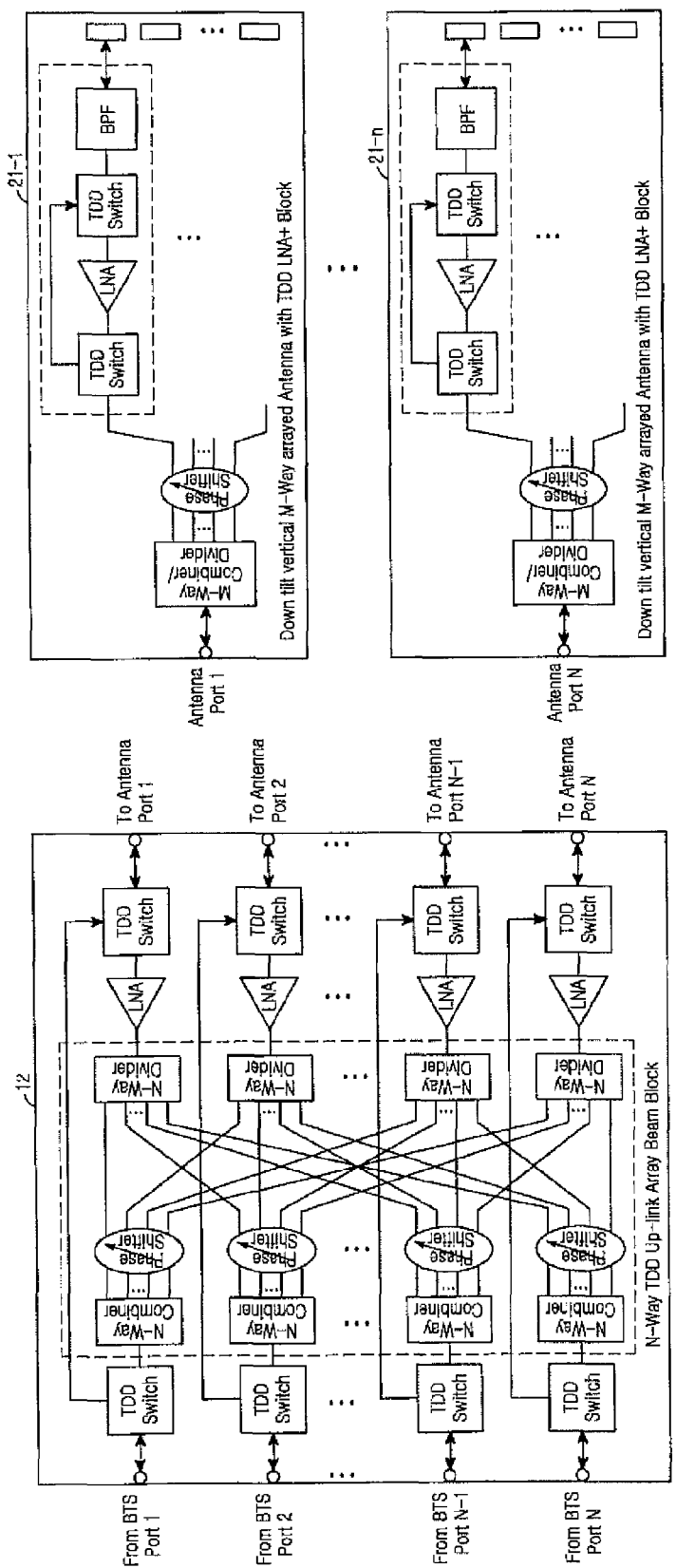
FIG. 13 is a block diagram of a whole BS array antenna system applied to the TDD system according to a fifth embodiment of the present invention.

FIG. 13 is a block diagram of a whole BS array antenna system applied to the TDD system according to a fifth embodiment of the present invention. Referring to FIG. 13, the array antenna system according to the fifth embodiment of the present invention includes one horizontal-beam-radiation-pattern-forming module 12 illustrated in FIG. 2 according to the second embodiment of the present invention and a plurality of vertical-beam-radiation-pattern-forming modules 21 illustrated in FIG. 5 according to the second embodiment of the present invention. This structure enables formation of n horizontally arrayed beams and electric vertical tilting only for the uplink in TDD and reduces the noise of received signals by the received signal amplifiers.

Figure 14:
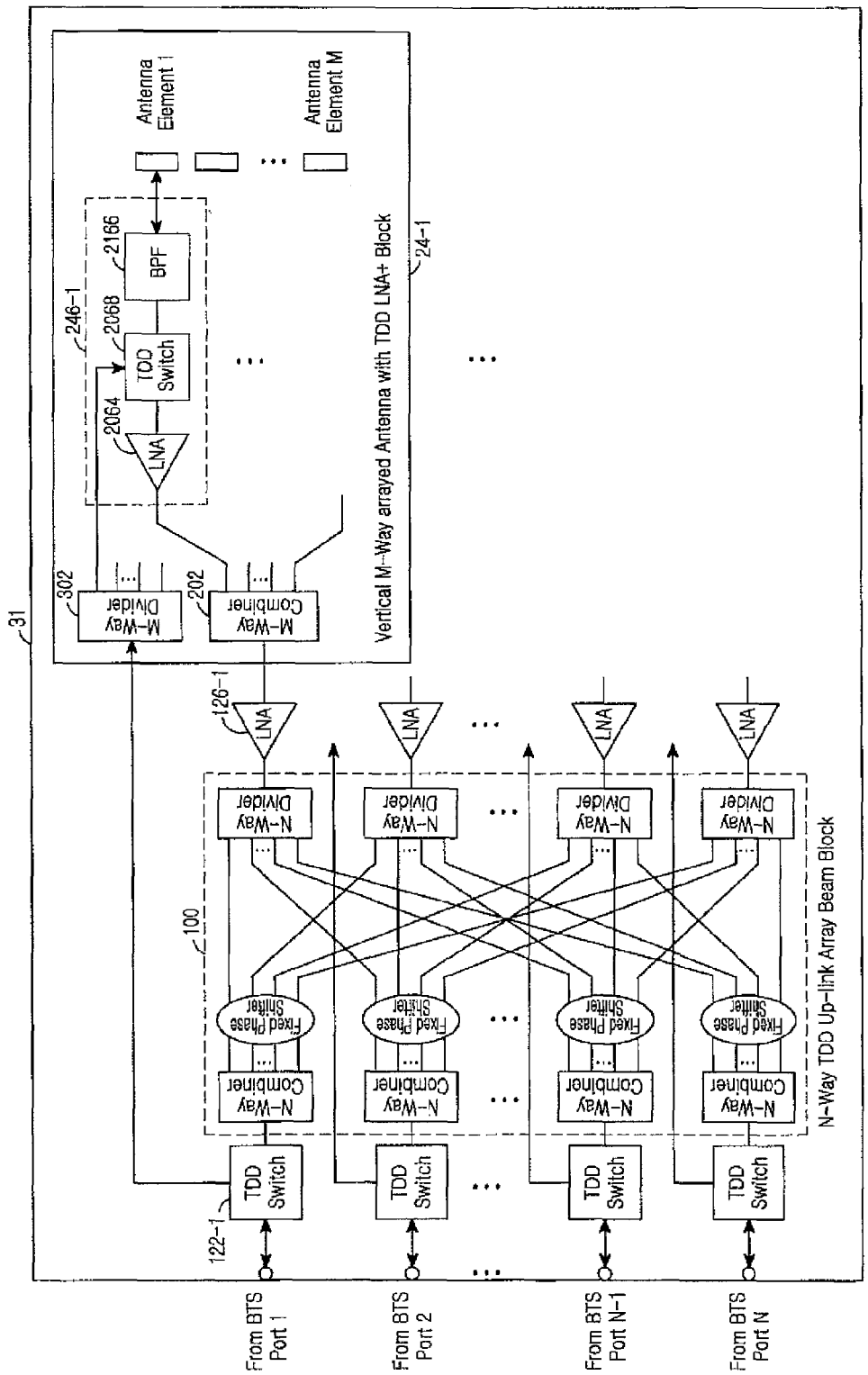
FIG. 14 is a block diagram of a whole BS array antenna system applied to the TDD system according to a sixth embodiment of the present invention.

FIG. 14 is a block diagram of a whole BS array antenna system applied to the TDD system according to a sixth embodiment of the present invention. Referring to FIG. 14, the array antenna system according to the sixth embodiment of the present invention can be considered a modification of the fifth embodiment of the present invention illustrated in FIG. 13, in which redundant components are eliminated from the structure of the fifth embodiment in the same manner as making a modification for the structure of FIG. 12.

That is, horizontal/vertical-beam-radiation-pattern-forming modules 31 illustrated in FIG. 14 are basically without second TDD switches 124-1 of the horizontal-beam-radiation-pattern-forming module 12 and the first TDD switches 2062 of the vertical-beam-radiation-pattern-forming modules 21 illustrated in FIG. 13. In the array antenna system, transmission signals switched by the first TDD switches 122-1 of the horizontal-beam-radiation-pattern-forming module 12 illustrated in FIG. 13 are directly provided to the modified vertical-beam-radiation-pattern-forming modules 23-1 to 23-m divided in the dividers 302, and then output directly to the second TDD switches 2068 in the modified vertical-beam-radiation-pattern-forming modules 23-1 to 23-m.

Figure 15:
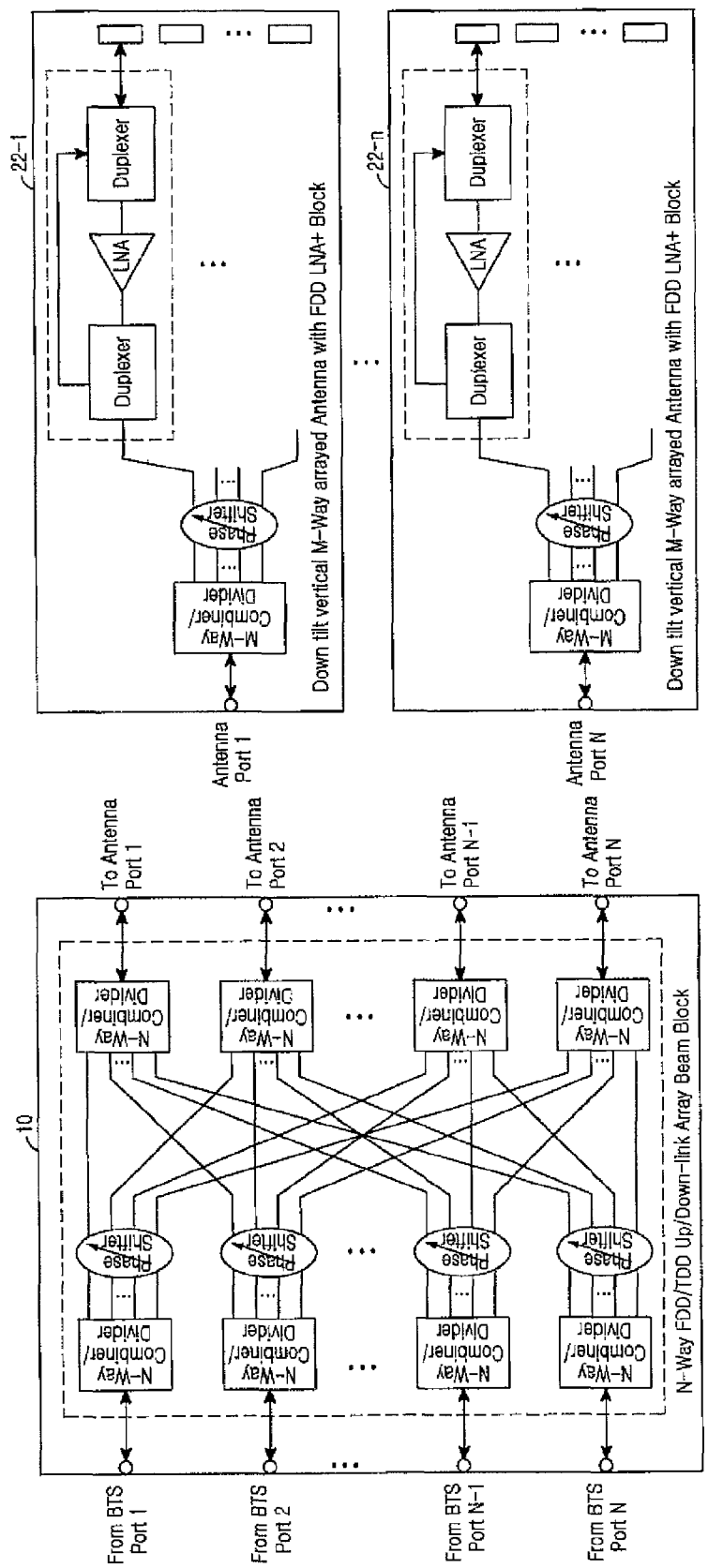
FIG. 15 is a block diagram of a whole BS array antenna system applied to the FDD system according to a seventh embodiment of the present invention.

FIG. 15 is a block diagram of a whole BS array antenna system applied to the FDD system according to a seventh embodiment of the present invention. Referring to FIG. 15, the array antenna system according to the fifth embodiment of the present invention includes one horizontal-beam-radiation-pattern-forming module 10 illustrated in FIG. 1 according to the first embodiment of the present invention and a plurality of vertical-beam-radiation-pattern-forming modules 22 illustrated in FIG. 6 according to the third embodiment of the present invention. This structure enables formation of n horizontally arrayed beams and electric vertical tilting for the downlink/uplink.

Figure 16:
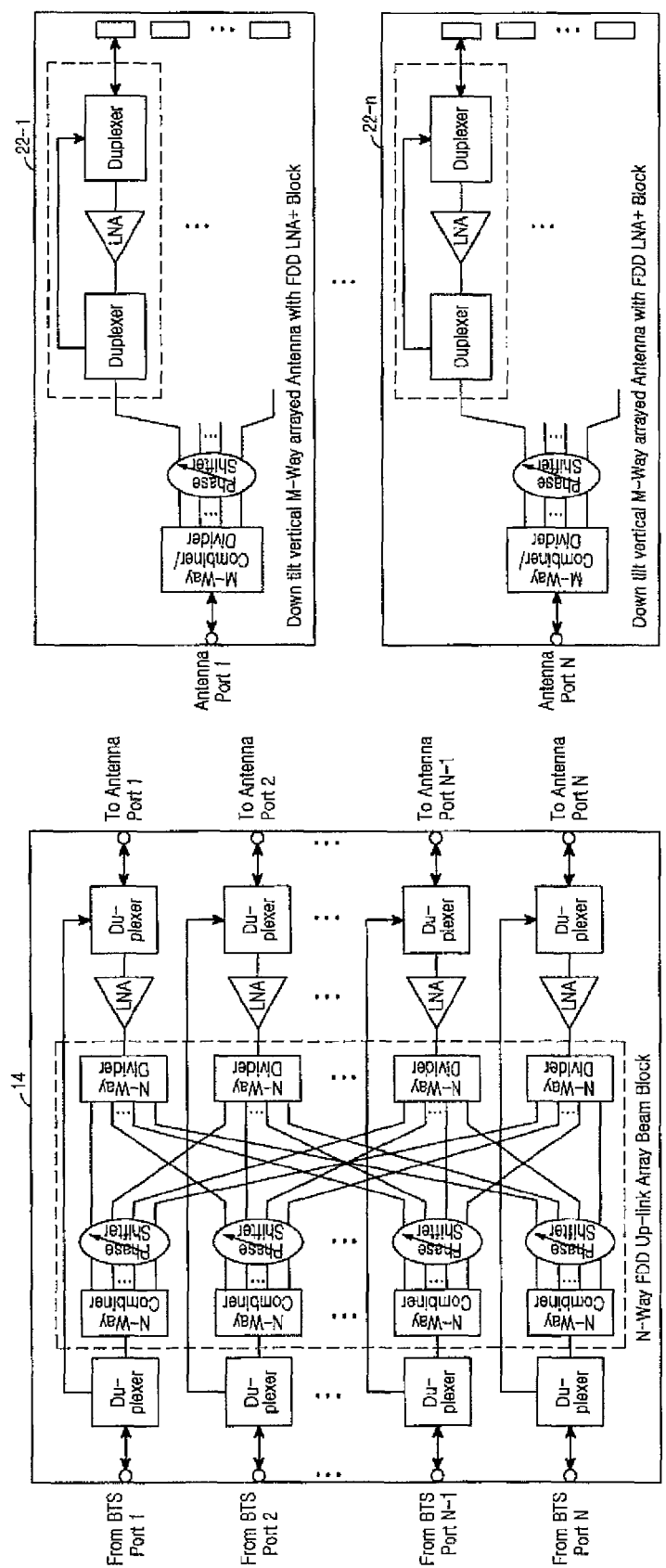
FIG. 16 is a block diagram of a whole BS array antenna system applied to the FDD system according to an eighth embodiment of the present invention.

FIG. 16 is a block diagram of a whole BS array antenna system applied to the FDD system according to an eighth embodiment of the present invention. Referring to FIG. 16, the array antenna system according to the eighth embodiment of the present invention includes one horizontal-beam-radiation-pattern-forming module 14 illustrated in FIG. 3 according to the third embodiment of the present invention and a plurality of vertical-beam-radiation-pattern-forming modules 22 illustrated in FIG. 6 according to the third embodiment of the present invention. This structure enables formation of n horizontally arrayed beams and electric vertical tilting for the uplink.

Figure 17:
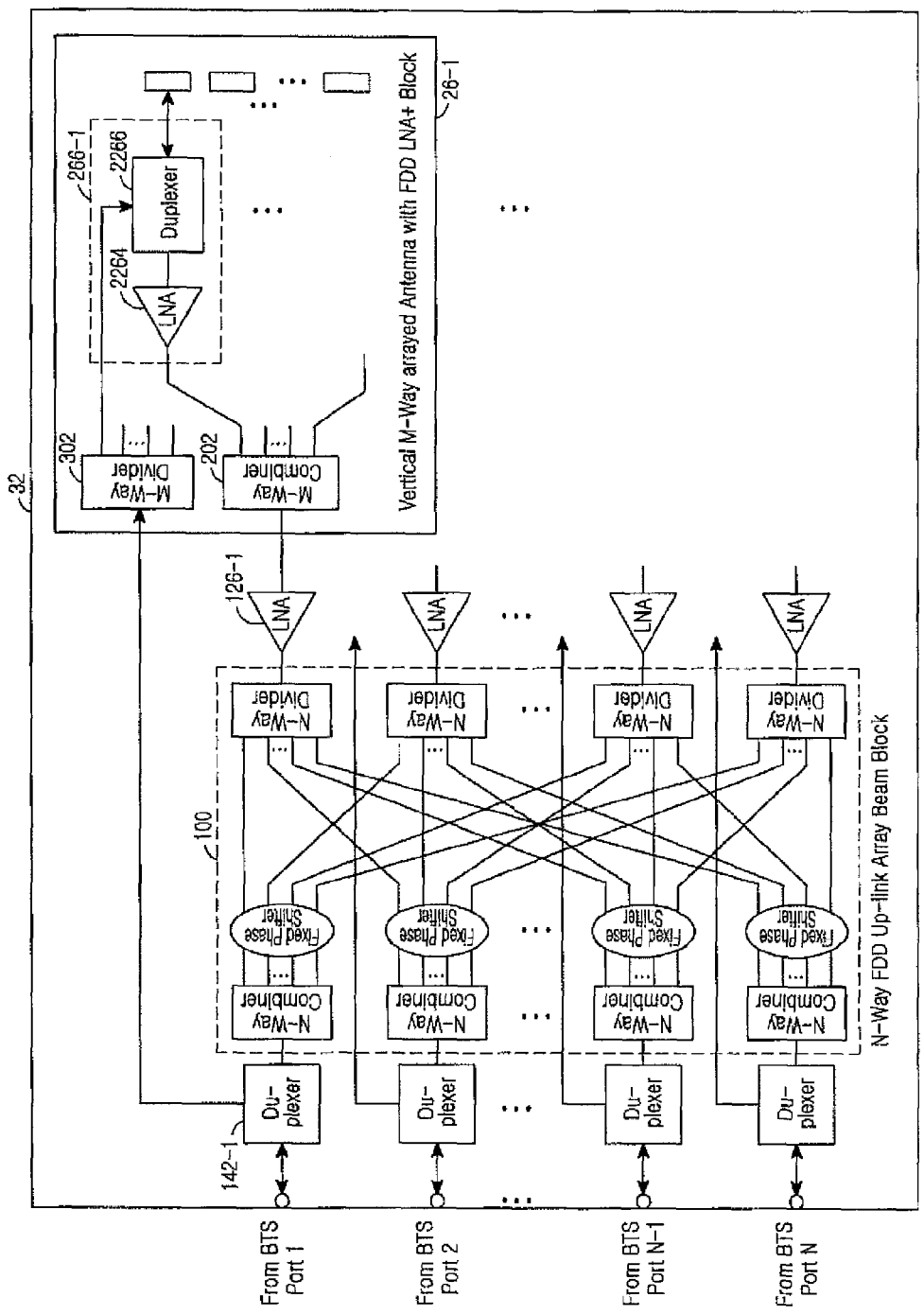
FIG. 17 is a block diagram of a whole BS array antenna system applied to the FDD system according to a ninth embodiment of the present invention.

FIG. 17 is a block diagram of a whole BS array antenna system applied to the FDD system according to a ninth embodiment of the present invention. Referring to FIG. 17, the array antenna system according to the ninth embodiment of the present invention can be considered a modification of the eighth embodiment of the present invention illustrated in FIG. 16, in which redundant components are eliminated from the structure of the eighth embodiment in the same manner as making a modification to the fifth embodiment in the structures of FIGS. 13 and 14.

That is, horizontal/vertical-beam-radiation-pattern-forming modules 32 illustrated in FIG. 17 are basically without the second TDD switches 144-1 of the horizontal-beam-radiation-pattern-forming module 14 and the first TDD switches 2262 of the vertical-beam-radiation-pattern-forming modules 22 illustrated in FIG. 16. In the array antenna system, transmission signals filtered by the first duplexers 142-1 to 142-n of the horizontal-beam-radiation-pattern-forming module 14 illustrated in FIG. 16 are directly provided to modified vertical-beam-radiation-pattern-forming modules 26-1 to 26-m (only 26-1 is shown), divided in the dividers 302, and then output directly to the second duplexers 2266 in the modified vertical-beam-radiation-pattern-forming modules 26-1 to 26-m.

While the invention has been shown and described with reference to certain exemplary embodiments of the present invention thereof, many modifications can be made within the scope of the present invention. For example, while it has been described that received signal amplifiers are provided for antenna elements in a one-to-one correspondence, each received signal amplifier can be given for two or more antenna elements. In this case, an additional combiner/divider is provided to connect each received signal amplifier to two or more antenna elements. Also, one of redundant LNAs can be eliminated in FIGS. 12, 14 and 17. For instance, an LNA 126-1 near the horizontal beam pattern forming module can be eliminated. Then, amplifiers with high amplification gains can be used for the LNAs 2064 and 2264 of the received signal amplifiers 236-1, 246-1 and 266-1.

Therefore, it will be understood by those skilled in the art that various changes in form and details may be made therein without departing from the spirit and scope of the present invention as defined by the appended claims and their equivalents.

[Effects]

As described above, the array antenna system for a BS according to the present invention maximizes a reception link gain especially in terms of hardware and minimizes loss in lines within an antenna.

What is claimed is:

1. An array antenna system in a Base Station (BS), comprising:
a horizontal-beam-radiation-pattern-forming module having a horizontal-beam-radiation-pattern-former configured to form a horizontal-beam radiation pattern for transmission/reception signals, to divide signals received from input/output ports at one end, to shift the phases of the divided signals complementarily, to combine the phase-shifted signals from the different input/output ports at the one end, to output the combined signals to input/output ports at the other end, and to output signals received from the input/output ports at the other end by a reverse operation to the input/output ports at the one end, for receiving/outputting a plurality of transmission/reception signals from/to a Base Transceiver Station (BTS) via the input/output ports at the one end of the horizontal-beam-radiation-pattern-former and receiving/outputting a plurality of transmission/reception signals from/to a plurality of antennas via the input/output ports at the other end of the horizontal-beam-radiation-pattern-former; and a plurality of vertical-beam-radiation-pattern-forming modules installed on the plurality of antennas, respectively, and configured to form a vertical-beam radiation pattern for the transmission/reception signals, each configured to receive a transmission signal from the horizontal-beam-radiation-pattern-forming module, to divide the transmission signal, to provide the divided signal to antenna elements, to filter and amplify signals received from the antenna elements according to a predetermined reception band, to combine the amplified signals, and to provide the combined signal to the horizontal-beam-radiation-pattern-forming module.

2. The array antenna system of claim 1, wherein the horizontal-beam-radiation-pattern-former comprises:

a plurality of first combiners/dividers, each configured to divide a transmission signal received through a combination port at one end, to output the divided signals to a plurality of division ports at the other end, to combine signals received through the division ports, and to output the combined signal to the combination port;

a plurality of phase shifters, each configured to receive the divided transmission signals from a first combiner/divider and to shift the phases of the received signals complementarily; and a plurality of second combiners/dividers, each configured to divide a signal received through a combination port at one end, to output the divided signals through a plurality of division ports at the other end, to combine transmission signals received through the division ports, and to output the combined signal to the combination port, wherein the combination ports of the first combiners/dividers correspond to the input/output ports at the one end of the horizontal-beam-radiation-pattern-former, connected to the BTS, the combination ports of the second combiners/dividers correspond to the input/output ports at the other end of the horizontal-beam-radiation-pattern-former, connected to the antennas, transmission signals output from the plurality of phase shifters are grouped, each group having different transmission signals, and the grouped transmission signals are provided to the division ports of the second combiners/dividers.

3. The array antenna system of claim 2, wherein the plurality of phase shifters are one of electrical variable phase shifters and mechanical variable phase shifters.

4. The array antenna system of claim 2, wherein each of the vertical-beam-radiation-pattern-forming modules comprises:

a combiner/divider configured to divide a transmission signal received from the horizontal-beam-radiation-pattern-forming module through one combination port at one end, to output the divided signals through a plurality of division ports at the other end, to combine signals received through the division ports, and to output the combined signal to the combination port;

a phase shifter configured to complementarily shift the phases of the divided transmission signals received from the combiner/divider, to output the phase-shifted transmission signals, and to provide signals received from the antenna elements to the combiner/divider by performing the operation for the transmission signals in a reverse order; and a plurality of received signal amplifiers configured to provide a plurality of transmission signals received from the phase shifters to the antenna elements, to filter signals received from the antenna elements according to the reception band, to amplify the filtered signals, and to output the amplified signals to the phase shifter.

5. The array antenna system of claim 4, wherein to separate a transmission path from a reception path in TDD, each of the received signal amplifiers comprises:

a first TDD switch configured to switch to the transmission path or the reception path according to a TDD switching control signal;

a second TDD switch connected to a predetermined antenna element, configured to switch to the transmission path or the reception path according to the TDD switching control signal;

a band pass filter configured to receive a signal from the second TDD switch and passing only frequencies of the reception band during a reception operation; and an LNA configured to low-noise-amplify the signal received from the band pass filter and providing the amplified signal to the first TDD switch.

6. The array antenna system of claim 4, wherein to separate a transmission path from a reception path in TDD, each of the received signal amplifiers comprises:

a first TDD switch configured to switch to the transmission path or the reception path according to a TDD switching control signal;

a band pass filter connected to a predetermined antenna element, and configured to filter transmission and reception bands;

a second TDD switch connected to the band pass filter, and configured to switch to the transmission path or the reception path according to the TDD switching control signal; and an LNA configured to low-noise-amplify a signal received from the second TDD switch and provide the amplified signal to the first TDD switch.

7. The array antenna system of claim 4, wherein to separate a transmission path from a reception path in FDD, each of the received signal amplifiers comprises:

first and second duplexers configured to filter transmission and reception bands; and an LNA in a reception path between the first and second duplexers, and configured to amplify a reception signal.

8. The array antenna system of claim 1, wherein the horizontal beam radiation pattern module further comprises a path former for outputting transmission signals of the BTS directly to the antennas in TDD or FDD and making reception signals of the BTS pass through the horizontal-beam-radiation-pattern-former.

9. The array antenna system of claim 8, wherein the path former comprises:

a plurality of first TDD switches installed in a plurality of input/output paths between the BTS and the horizontal-beam-radiation-pattern-former, the TDD switches configured to separate transmission signals from reception signal according to a TDD switching control signal received from an external control module, to provide the reception signals received from the horizontal-beam-radiation-pattern-former to the BTS, and to make the transmission signals bypass the horizontal-beam-radiation-pattern-former; and a plurality of second TDD switches installed in a plurality of input/output paths between the antennas and the horizontal-beam-radiation-pattern-former, the second TDD switches configured to separate transmission signals from reception signal according to the TDD switching control signal received from the external control module, to provide the reception signals received from the antennas to the horizontal-beam-radiation-pattern-former and to provide the transmission signals received from the first TDD switches to the antennas.

10. The array antenna system of claim 9, further comprising a plurality of Low-Noise-Amplifiers (LNAs) in reception paths between the second TDD switches and the horizontal-beam-radiation-pattern-former, the LNAs configured to low-noise amplify reception signals.

11. The array antenna system of claim 8, wherein the path former comprises:
a plurality of first duplexers installed in a plurality of input/output paths between the BTS and the horizontal-beam-radiation-pattern-former, the first duplexers configured to filter transmission and reception signals, to provide the filtered reception signals received from the horizontal-beam-radiation-pattern-former to the BTS, and to make the filtered transmission signals bypass the horizontal-beam-radiation-pattern-former; and
a plurality of second duplexers installed in a plurality of input/output paths between the antennas and the horizontal-beam-radiation-pattern-former, the second duplexers configured to filter transmission and reception signals, to provide the filtered reception signals received from the antennas to the horizontal-beam-radiation-pattern-former and to provide the transmission signals received from the first duplexers to the antennas.

12. The array antenna system of claim 11, further comprising a plurality of LNAs in reception paths between the second duplexers and the horizontal-beam-radiation-pattern-former, for low-noise-amplifying reception signals.

13. The array antenna system of claim 8, wherein each of the vertical-beam-radiation-pattern-forming modules comprises:
a combiner/divider configured to divide a transmission signal received from the horizontal-beam-radiation-pattern-forming module through one combination port at one end, to output the divided signals through a plurality of division ports at the other end, to combine signals received through the division ports, and to output the combined signal to the combination port;
a phase shifter configured to complementarily shift the phases of the divided transmission signals received from the combiner/divider, to output the phase-shifted transmission signals, and to provide signals received from the antenna elements to the combiner/divider by performing the operation for the transmission signals in a reverse order; and
a plurality of received signal amplifiers configured to provide a plurality of transmission signals received from the phase shifters to the antenna elements, to filter signals received from the antenna elements according to the reception band, to amplify the filtered signals, and to output the amplified signals to the phase shifter.

14. The array antenna system of claim 13, wherein to separate a transmission path from a reception path in TDD, each of the received signal amplifiers comprises:
a first TDD switch configured to switch to the transmission path or the reception path according to a TDD switching control signal;
a second TDD switch connected to a predetermined antenna element, configured to switch to the transmission path or the reception path according to the TDD switching control signal;
a band pass filter configured to receive a signal from the second TDD switch and passing only frequencies of the reception band during a reception operation; and
an LNA configured to low-noise-amplify the signal received from the band pass filter and providing the amplified signal to the first TDD switch.

15. The array antenna system of claim 13, wherein to separate a transmission path from a reception path in TDD, each of the received signal amplifiers comprises:
a first TDD switch configured to switch to the transmission path or the reception path according to a TDD switching control signal;
a band pass filter connected to a predetermined antenna element, and configured to filter transmission and reception bands;
a second TDD switch connected to the band pass filter, and configured to switch to the transmission path or the reception path according to the TDD switching control signal; and
an LNA configured to low-noise-amplify a signal received from the second TDD switch and provide the amplified signal to the first TDD switch.

16. The array antenna system of claim 13, wherein to separate a transmission path from a reception path in FDD, each of the received signal amplifiers comprises:
first and second duplexers configured to filter transmission and reception bands; and
an LNA in a reception path between the first and second duplexers, and configured to amplify a reception signal.

17. The array antenna system of claim 1, wherein each of the vertical-beam-radiation-pattern-forming modules comprises:
a combiner/divider configured to divide a transmission signal received from the horizontal-beam-radiation-pattern-forming module through one combination port at one end, to output the divided signals through a plurality of division ports at the other end, to combine signals received through the division ports, and to output the combined signal to the combination port;
a phase shifter configured to complementarily shift the phases of the divided transmission signals received from the combiner/divider, to output the phase-shifted transmission signals, and to provide signals received from the antenna elements to the combiner/divider by performing the operation for the transmission signals in a reverse order; and
a plurality of received signal amplifiers configured to provide a plurality of transmission signals received from the phase shifters to the antenna elements, to filter signals received from the antenna elements according to the reception band, to amplify the filtered signals, and to output the amplified signals to the phase shifter.

18. The array antenna system of claim 17, wherein to separate a transmission path from a reception path in TDD, each of the received signal amplifiers comprises:

a first TDD switch configured to switch to the transmission path or the reception path according to a TDD switching control signal;
a second TDD switch connected to a predetermined antenna element, configured to switch to the transmission path or the reception path according to the TDD switching control signal;
a band pass filter configured to receive a signal from the second TDD switch and passing only frequencies of the reception band during a reception operation; and
an LNA configured to low-noise-amplify the signal received from the band pass filter and provide the amplified signal to the first TDD switch.

19. The array antenna system of claim 17, wherein to separate a transmission path from a reception path in TDD, each of the received signal amplifiers comprises:
a first TDD switch configured to switch to the transmission path or the reception path according to a TDD switching control signal;
a band pass filter connected to a predetermined antenna element, and configured to filter transmission and reception bands;
a second TDD switch connected to the band pass filter, and configured to switch to the transmission path or the reception path according to the TDD switching control signal; and
an LNA configured to low-noise-amplify a signal received from the second TDD switch and provide the amplified signal to the first TDD switch.

20. The array antenna system of claim 17, wherein to separate a transmission path from a reception path in FDD, each of the received signal amplifiers comprises:
first and second duplexers configured to filter transmission and reception bands; and
an LNA in a reception path between the first and second duplexers, and configured to amplify a reception signal.

* * * * *